US012219469B2

(12) United States Patent
Eriksson et al.

(10) Patent No.: US 12,219,469 B2
(45) Date of Patent: *Feb. 4, 2025

(54) METHODS, SYSTEMS AND WIRELESS COMMUNICATION DEVICES FOR HANDLING CLOUD COMPUTING RESOURCES

(71) Applicant: Telefonaktiebolaget LM Ericsson (publ), Stockholm (SE)

(72) Inventors: Hans Eriksson, Sollentuna (SE); Lars Westberg, Huddinge (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/207,720

(22) Filed: Jun. 9, 2023

(65) Prior Publication Data

US 2023/0319695 A1   Oct. 5, 2023

Related U.S. Application Data

(63) Continuation of application No. 17/851,634, filed on Jun. 28, 2022, now Pat. No. 11,711,756, which is a
(Continued)

(51) Int. Cl.
*H04W 48/00* (2009.01)
*H04W 28/02* (2009.01)
(Continued)

(52) U.S. Cl.
CPC ....... *H04W 48/17* (2013.01); *H04W 28/0226* (2013.01); *H04W 36/322* (2023.05); *H04W 48/04* (2013.01)

(58) Field of Classification Search
CPC ..... H04W 48/04; H04W 48/17; H04W 48/20; H04W 28/0226; H04W 4/025; H04L 67/10; H04L 67/1021
See application file for complete search history.

(56) References Cited

U.S. PATENT DOCUMENTS 11,405,860 B2   8/2022   Eriksson et al.
2013/0138814 A1   5/2013   Kotecha
(Continued)

FOREIGN PATENT DOCUMENTS

WO   2017127102 A1   7/2017

*Primary Examiner* — Robert C Scheibel
(74) *Attorney, Agent, or Firm* — COATS & BENNETT, PLLC

(57) ABSTRACT

A method is disclosed for handling cloud computing resources in a wireless communication network comprising a first and a second access subnetwork providing wireless access to wireless communication devices residing in a first and a second geographic area, respectively, and a first and a second cloud computing resource connected to the first and the second access subnetwork, respectively. The method comprises obtaining mobility information over a time period for the wireless communication devices of when, during the time period, each of the devices has wireless access to the communication network via the first access subnetwork and when they have wireless access to the communication network via the second access subnetwork. The method also comprises selecting which of the first or second cloud computing resource that is to serve each of the devices based on the obtained mobility information, and sending an instruction to each of the devices to connect to a server that is connected to the selected cloud computing resource for that wireless communication device.

17 Claims, 7 Drawing Sheets

Related U.S. Application Data continuation of application No. 17/044,871, filed as application No. PCT/SE2018/050424 on Apr. 25, 2018, now Pat. No. 11,405,860.

(51) Int. Cl.
*H04W 36/32* (2009.01)
*H04W 48/04* (2009.01)

(56) References Cited

U.S. PATENT DOCUMENTS

| | | |
|---|---|---|
| 2014/0269364 A1 | 9/2014 | Knapp et al. |
| 2014/0279723 A1* | 9/2014 | McGavran ............. G06N 5/022 |
| | | 707/610 |
| 2015/0088972 A1* | 3/2015 | Brand ..................... H04L 67/52 |
| | | 709/203 |
| 2015/0120930 A1* | 4/2015 | Kamthe ................ H04W 48/20 |
| | | 709/226 |
| 2015/0133144 A1* | 5/2015 | Haro ................. H04W 52/0209 |
| | | 455/456.1 |
| 2015/0223190 A1* | 8/2015 | Backman .............. H04W 76/10 |
| | | 370/328 |
| 2017/0220394 A1* | 8/2017 | Shim ........................ H04W 4/70 |
| 2019/0058767 A1* | 2/2019 | Chandramouli .. H04W 36/0019 |
| 2019/0340876 A1* | 11/2019 | Northrup ............ G07F 17/3241 |

* cited by examiner

METHODS, SYSTEMS AND WIRELESS COMMUNICATION DEVICES FOR HANDLING CLOUD COMPUTING RESOURCES

RELATED APPLICATIONS

The present application is a continuation of U.S. patent application Ser. No. 17/851,634 filed on Jun. 28, 2022, and issued as U.S. Pat. No. 11,711,756 on Jul. 25, 2023, which is a continuation of U.S. patent application Ser. No. 17/044,871 filed on Oct. 2, 2020, and issued as U.S. Pat. No. 11,405,860 on Aug. 2, 2022, which is a national stage application of PCT/SE2018/050424 filed Apr. 25, 2018, the disclosures of each of which are incorporated herein by reference in their entirety.

TECHNICAL FIELD

The present disclosure relates generally to methods, wireless communication devices as well as systems of a wireless communication network for handling cloud computing resources. The present disclosure further relates to computer programs and carriers corresponding to the above methods, systems and wireless communication devices.

BACKGROUND

For some years now, there has been a continuous increase in "cloud computing" in the communication realm. Cloud computing means that users, such as operators of wireless communication networks, reduce their investments in hardware and software but instead lease computing resources in large data centres that are accessed for example over the Internet. While cloud computing offers increased flexibility and reduced costs, there are also real-time limitations due to the physical distances from the large data centres to nodes of the communication network and communication devices which are to use the data produced or stored at the data centres, and due to possible network congestion and limitations of transport protocols. These real-time limitations have sparked an interest in geographically dispersed data centres, "distributed cloud computing resources", also known as "distributed clouds".

In distributed clouds, data for clients such as wireless communication devices are distributed over the computing resources in the distributed cloud in order to reduce the total round trip time, RTT, in the communication network, the packet loss and the cost of deployment. Further, data for wireless communication devices is also distributed in the clouds based on predicted load. However, there is a need to more efficiently distribute data and applications for wireless communication devices among computing resources in a distributed cloud.

SUMMARY

It is an object of the invention to address at least some of the problems and issues outlined above. An object of embodiments of the invention is to efficiently distribute data and applications for wireless communication devices among computing resources in a distributed cloud. It is possible to achieve these objects and others by using methods, systems and wireless communication devices as defined in the attached independent claims.

According to one aspect, a method for handling cloud computing resources is provided, performed by a system of a wireless communication network. The wireless communication network comprising a first access subnetwork providing wireless access to wireless communication devices residing in a first geographic area, a second access subnetwork providing wireless access to wireless communication devices residing in a second geographic area. The wireless communication network further comprises a first cloud computing resource connected to the first access subnetwork, and a second cloud computing resource connected to the second access subnetwork. The method comprises obtaining mobility information over a time period for a plurality of wireless communication devices having wireless access to the communication network, the mobility information comprising information of when, during the time period, each of the plurality of wireless communication devices has wireless access to the communication network via the first access subnetwork, and when each of the plurality of wireless communication devices has wireless access to the communication network via the second access subnetwork. The method further comprises selecting which of the first or second cloud computing resource that is to serve each of the plurality of wireless communication devices based on the obtained mobility information of the plurality of wireless communication devices, and sending an instruction to each of the plurality of wireless communication devices to connect to a server that is connected to the selected cloud computing resource for that wireless communication device, or for each of the plurality of wireless communication devices, triggering routing of data directed towards the wireless communication device or originating from the wireless communication device to the selected cloud computing resource.

According to another aspect, a method for handling cloud computing resources is provided, performed by a wireless communication device in communication with a wireless communication network. The wireless communication network comprises a first access subnetwork for providing wireless access to wireless communication devices residing in a first geographic area, and a second access subnetwork for providing wireless access to wireless communication devices residing in a second geographic area. The wireless communication network further comprises a first cloud computing resource connected to the first access subnetwork and a second cloud computing resource connected to the second access subnetwork. The method comprises providing, to the wireless communication network, mobility information over a time period, the mobility information comprising information of when, during the time period, the wireless communication device has wireless access to the communication network via the first access subnetwork and when the wireless communication device has wireless access to the communication network via the second access subnetwork. The method further comprises receiving, from the wireless communication network, an instruction to connect to a server that is connected to a selected one of the first or the second cloud computing resource, the selection of first or second cloud computing resources being based on the provided mobility information.

According to another aspect, a system operable in a wireless communication network, and configured for handling cloud computing resources is provided. The wireless communication network comprises a first access subnetwork providing wireless access to wireless communication devices residing in a first geographic area, a second access subnetwork providing wireless access to wireless communication devices residing in a second geographic area, and a first cloud computing resource connected to the first access subnetwork and a second cloud computing resource connected to the second access subnetwork. The system comprises a processing circuitry and a memory. The memory contains instructions executable by said processing circuitry, whereby the system is operative for obtaining mobility information over a time period for a plurality of wireless communication devices having wireless access to the communication network, the mobility information comprising information of when, during the time period, each of the plurality of wireless communication devices has wireless access to the communication network via the first access subnetwork and when, each of the plurality of wireless communication devices has wireless access to the communication network via the second access subnetwork. The system is further operative for selecting which of the first or second cloud computing resource that is to serve each of the plurality of wireless communication devices based on the obtained mobility information of the plurality of wireless communication devices, and for sending an instruction to each of the plurality of wireless communication devices to connect to a server that is connected to the selected cloud computing resource for that wireless communication device, or, for each of the plurality of wireless communication devices, triggering routing of data directed towards the wireless communication device or originating from the wireless communication device to the selected cloud computing resource.

According to another aspect, a wireless communication device configured for communication with a wireless communication network is provided. The wireless communication network comprises a first access subnetwork for providing wireless access to wireless communication devices residing in a first geographic area, a second access subnetwork for providing wireless access to wireless communication devices residing in a second geographic area, a first cloud computing resource connected to the first access subnetwork and a second cloud computing resource connected to the second access subnetwork. The wireless communication device comprises a processing circuitry and a memory. The memory contains instructions executable by said processing circuitry, whereby the wireless communication device is operative for providing, to the wireless communication network, mobility information over a time period, the mobility information comprising information of when, during the time period, the wireless communication device has wireless access to the communication network via the first access subnetwork and when the wireless communication device has wireless access to the communication network via the second access subnetwork. The wireless communication device is further operative for receiving, from the wireless communication network, an instruction to connect to a server that is connected to a selected one of the first or the second cloud computing resource, the selection of first or second cloud computing resources being based on the provided mobility information.

According to other aspects, computer programs and carriers are also provided, the details of which will be described in the claims and the detailed description.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

The characteristics that are used today for determining the "best" cloud computing resource of a plurality of geographically distributed cloud computing resources for handling data of wireless communication devices in a wireless communication network are based on network characteristics such as RTT, packet loss and cost of deployment. The inventors have found out that network performance such as RTT can be lowered even more by distributing handling of data for the wireless communication devices across distributed cloud computing resources based on the mobility of the individual wireless communication devices. In other words, based on how individual wireless communication devices move in the network, they are to be handled by different cloud computing resources. In a first step, the mobility of wireless communication devices is observed for a longer time, at least over days but preferably over even longer time periods such as weeks or months, in order to determine a regular mobility pattern for a wireless communication device. In a second step, if it has been determined that a wireless communication device moves predominantly within one and the same access subnetwork, this wireless communication device is connected to a local distributed cloud computing resource connected to this access subnetwork. Thereafter, the handling of data for this wireless communication device is performed by the local distributed cloud computing resource connected to this access subnetwork. On the other hand, in the second step, if another wireless communication device is determined to be moving over wide distances, e.g. globally, this device is connected to a global cloud computing resource that is connected to many different wireless access subnetwork, probably via core networks and/or IP backbone networks. Hereby, handling of wireless communication devices by cloud computing resources can be optimized in order to e.g. lower RTT for communication between a cloud computing resource handling a wireless communication device and the wireless communication device.

Figure 1:
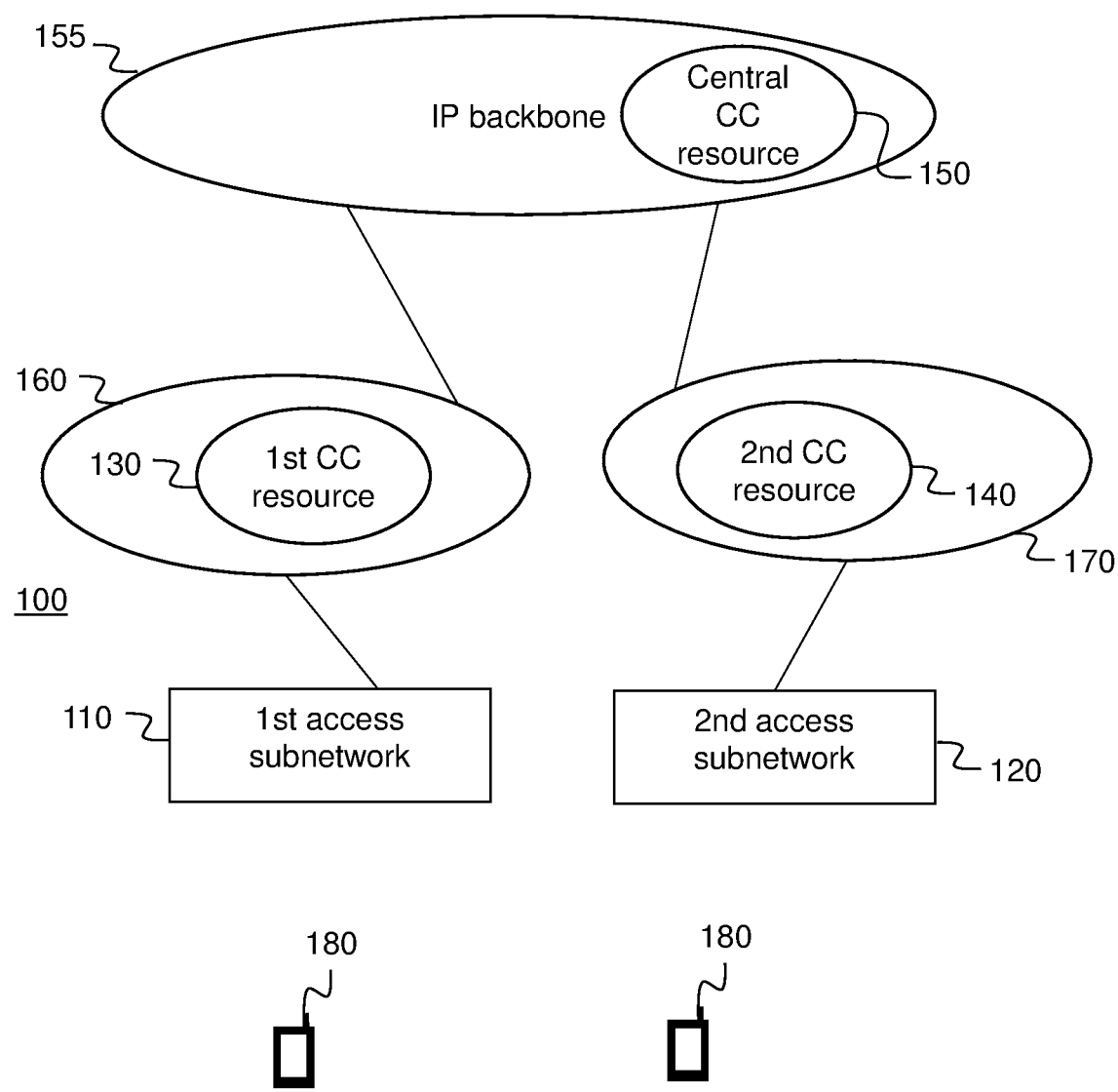
FIG. 1 is a schematic block diagram of a wireless communication network in which the present invention may be used.

FIG. 1 describes an exemplary wireless communication network 100 in which the present invention may be used. The wireless communication network comprises one or more access subnetworks that provides radio access to wireless communication devices 180. The one or more access subnetworks comprises a plurality of radio access network nodes, aka base stations, geographically dispersed in order to provide radio access to the wireless communication devices in geographically dispersed areas. The one or more access subnetworks is connected to one or more core networks, which in turn may be connected to IP backbone networks in order to e.g. handle services dispersed in the wireless communication network. The wireless communication network of FIG. 1 comprises a first access subnetwork 110 providing radio access in a first geographic area and a second access subnetwork 120 providing radio access in a second geographic area. The first access subnetwork 110 is in its turn connected to a first core subnetwork 160 in which a first local cloud computing resource 130 is situated. The second access subnetwork 120 is connected to a second core subnetwork 170 in which a second local cloud computing resource 140 is situated. The first and the second core subnetwork 160, 170 may comprise any kind of core network functionality such as access aggregation and backbone technologies. The network 100 of FIG. 1 also comprises a central cloud computing resource 150, which is connected to the first and the second core subnetwork 160, 170, via which the central cloud computing resource 150 can connect to the first and second access subnetwork 110, 120.

The wireless communication network 100 may be any kind of wireless communication network capable of providing radio access to wireless communication devices. Example of such wireless communication networks are Global System for Mobile communication (GSM), Enhanced Data Rates for GSM Evolution (EDGE), Universal Mobile Telecommunications System (UMTS), Code Division Multiple Access 2000 (CDMA 2000), Long Term Evolution (LTE), LTE Advanced, Wireless Local Area Networks (WLAN), Worldwide Interoperability for Microwave Access (WiMAX), WiMAX Advanced, as well as fifth generation wireless communication networks based on technology such as New Radio (NR).

The wireless communication devices 180 may be any type of device capable of wirelessly communicating with the first and second access subnetwork 110, 120 using radio signals. For example, the individual wireless communication devices 180 may be a User Equipment (UE), a machine type UE or a UE capable of machine to machine (M2M) communication, a sensor, a tablet, a mobile terminal, a smart phone, a laptop embedded equipped (LEE), a laptop mounted equipment (LME), a USB dongle, a Customer Premises Equipment (CPE) etc.

Figure 2:
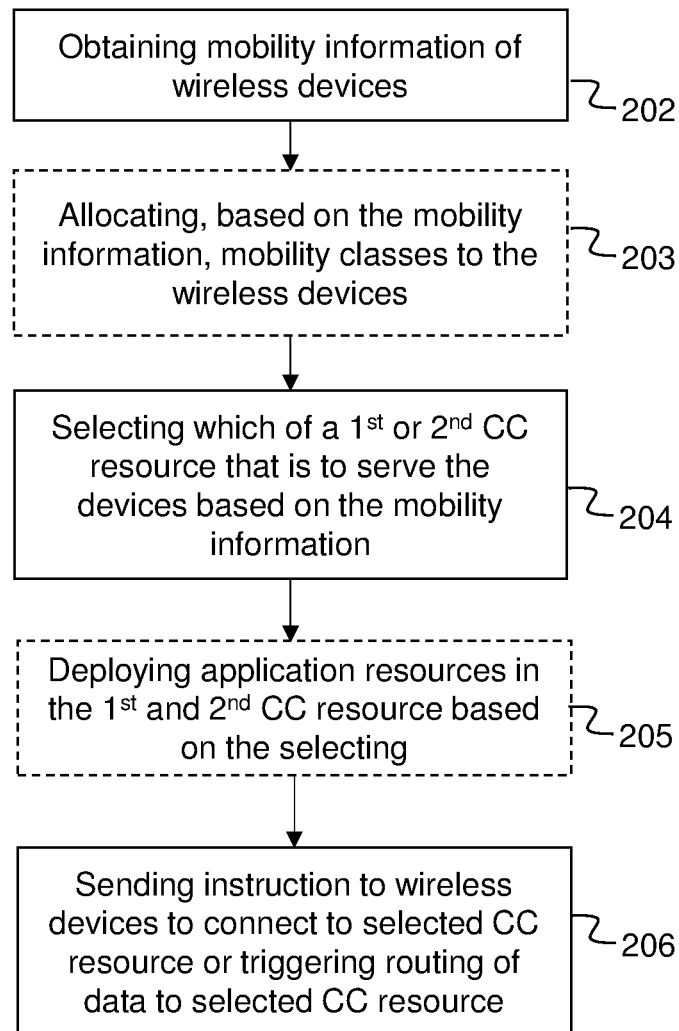
FIG. 2 is a flow chart of a method performed by a system, according to possible embodiments.

FIG. 2, in conjunction with FIG. 1, describes a method performed by a system of a wireless communication network 100 for handling cloud computing resources. The wireless communication network comprising a first access subnetwork 110 providing wireless access to wireless communication devices 180 residing in a first geographic area, a second access subnetwork 120 providing wireless access to wireless communication devices residing in a second geographic area. The wireless communication network further comprises a first cloud computing resource 130 connected to the first access subnetwork 110, and a second cloud computing resource 140 connected to the second access subnetwork 120. The method comprises obtaining 202 mobility information over a time period for a plurality of wireless communication devices 180 having wireless access to the communication network, the mobility information comprising information of when, during the time period, each of the plurality of wireless communication devices 180 has wireless access to the communication network 100 via the first access subnetwork 110, and when each of the plurality of wireless communication devices 180 has wireless access to the communication network 100 via the second access subnetwork 120. The method further comprises selecting 204 which of the first or second cloud computing resource 130, 140 that is to serve each of the plurality of wireless communication devices 180 based on the obtained mobility information of the plurality of wireless communication devices, and sending 206 an instruction to each of the plurality of wireless communication devices 180 to connect to a server that is connected to the selected cloud computing resource for that wireless communication device 180, or for each of the plurality of wireless communication devices, triggering routing of data directed towards the wireless communication device or originating from the wireless communication device to the selected cloud computing resource.

By selecting cloud computing resources for communication devices based on their individual mobility patterns, communication devices (or data related to communication devices) can be handled where they are best handled in order to avoid tromboning effects as well as to reduce latency for handling communication devices from cloud computing resources. In other words, if it is determined that a communication device most of the time receives wireless access from a first access subnetwork, this communication device should be served by a cloud computing resource that is locally connected to the first access subnetwork.

An access subnetwork could be any part of a communication network that serves wireless communication devices with radio access to the communication network, such as one or more base stations providing radio access to the wireless communication devices in one or more geographically limited cell, or a larger area covering many different base stations and cells. The first geographic area is different from the second geographic area. However, overlap may occur. A difference between the first access subnetwork 110 and the second access subnetwork 120 is that the first cloud computing resource 130 has a local connection to the first access subnetwork 110 and not to the second access subnetwork 120, and the second cloud computing resource 140 has a local connection to the second access subnetwork 120 and not to the first access subnetwork 110. The time period over which the mobility information is obtained would normally be at least one day and up to weeks or even months, but possibly even years. The information of when a wireless communication device is connected to the first access subnetwork 110 and when a wireless communication device is connected to the second access subnetwork 120 could be obtained from GPS-information obtained from the wireless communication device or from the network, from handover information from any of the first or second access subnetwork e.g. via a packet core network, or from information from any location-based service, comprising for example cell ID. Alternatively, the information of when a wireless communication device is connected to the first access subnetwork and to the second access subnetwork could be based on a predicted mobility path in case of deployments being prepared before mobility event happens. The sending 206 of an instruction could be performed by sending a Domain Name Server (DNS) redirect or a Hypertext Transfer Protocol (HTTP) redirect to the communication device including the address of the server that is connected to the selected cloud computing resource, the redirect instructing the communication device to connect to the server. The system of the wireless communication network that performs the method may be a wireless communication network node, such as a core network node or an access network node or a router. Alternatively, the system of the wireless communication network that performs the method may be a group of network nodes, wherein functionality for performing the method are spread out over different physical, or virtual, nodes of the network. In other words, the system for improving use of cloud computing resources may in its turn be a cloud-solution, i.e. the system may be deployed as cloud computing resources that may be distributed in the network.

According to an embodiment, the selecting 204 comprises selecting the first cloud computing resource 130 for the ones of the plurality of wireless communication devices 180 that predominantly have wireless access to the communication network 100 via the first access subnetwork 110 during the time period, and selecting the second cloud computing resource 140 for the ones of the plurality of wireless communication devices 180 that predominantly have wireless access to the communication network 100 via the second access subnetwork 120 during the time period. For determining whether a communication device is predominantly connected to the first or the second access subnetwork, the frequency of positions from the mobility information could be compared to a threshold. Hereby, data latency will be low at a predominant amount of time.

According to another embodiment, the selecting 204 of which of the first or the second cloud computing resource 130, 140 that is to serve each of the plurality of wireless communication devices 180 is based on capacity of the first and the second cloud computing resource or on communication capacity from the first and the second cloud computing resource and its respective first and second access subnetwork 110, 120, as well as on the obtained mobility information of the plurality of wireless communication devices 180. Hereby, use of the different cloud-computing resources in relation to data latency and tromboning effects for individual communication devices can be optimally balanced.

According to another embodiment, the selecting 204 of which of the first or second cloud computing resource 130, 140 that is to serve each of the plurality of wireless communication devices 180 is further based on mobility pattern, such as velocity of the wireless communication device or number of handovers performed by the wireless communication device, and/or communication pattern, such as amount of communication with application servers of the plurality of wireless communication devices 180. I.e. if the communication device usually communicates much data, such as video, or if the device is a less-data intensive device, such as a sensor-type device, different cloud computing resources may be selected. Communication pattern could be provided by an application server using 5G network exposure provisioning service, such as defined in 3GPP TS 23.502, for more information see further below.

According to another embodiment, the method further comprises deploying 205 application resources in the first and second cloud computing resource 130, 140 based on the selecting 204 of the first or the second cloud computing resource for the plurality of wireless communication devices 180. An application is in this context an end-user application that is requested by the wireless communication device. An application resource may be a server. According to a version of this embodiment, the wireless communication network provides a plurality of different content-specific applications. An example of a content-specific application requested by the wireless communication device is Pokemon Go™. In this version, the system may analyze which of the plurality of content-specific applications that the plurality of wireless communication devices have installed or have used during the time period. The deployment 205 of application resources may then be performed based on the selecting 204 and on the analysis of which of the content-specific applications that the devices have installed or used. The analysis may be if the application is frequent in use. The analysis may also be to detect if a change in usage occurs, for example to detect a sudden increase in usage of the application in an area, e.g. to detect flash crowds, in order to be able to increase capacity for handling such increase. For performing such an analysis, you may need to check the usage in servers in a central data center for determining the applications in the cloud. Traffic analysis is also a way to identify the usage of applications. For example, a "wire tap" may be probed to get traffic traces. The deployment 205 of application resources is then preferably performed before instructions are sent 206 to the wireless devices or routing has been triggered, so that the application resources are deployed before the data is sent to the selected resources. However, instructions may already have been sent 206 as well, and a deployment of (increased) application resources may be performed as it is determined that more resources is needed, on the fly.

According to another embodiment, the communication network 100 further comprises a central cloud computing resource 150 connected to the first access subnetwork 110 and to the second access subnetwork 120 via a respective core subnetwork 160, 170 in which the respective first and second cloud computing resource 130, 140 is arranged. Further, the selecting 204 comprises selecting the first cloud computing resource 130 for the ones of the plurality of wireless communication devices that predominantly has wireless access to the communication network 100 via the first access subnetwork 110 during the time period, selecting the second cloud computing resource 140 for the ones of the plurality of wireless communication devices that predominantly has wireless access to the communication network 100 via the second access subnetwork 120 during the time period, and selecting the central cloud computing resource 150 for the ones of the plurality of wireless communication devices which wireless access to the communication network 100 is alternating between the first access subnetwork 110 and the second access subnetwork 120 during the time period. Hereby, tromboning effects are avoided for the communication devices that travel a lot between the first and the second access subnetwork. Alternatively, it is avoided to often trigger change of routing between first and second cloud computing resource depending on the movement of such communication devices. The respective core sub-network may be a backbone network, e.g. an IP transport network.

According to another embodiment, the communication network 100 further comprises a central cloud computing resource 150 connected to the first access subnetwork 110 and to the second access subnetwork 120. The method further comprises allocating 203, based on the mobility information, each of the plurality of wireless communication devices to either a first class for local mobility in the first access subnetwork 110, a second class for local mobility in the second access subnetwork 120, or a global class for mobility in both the first and the second access subnetwork. Further, the selecting 204 comprises selecting the first local cloud computing resource 130 for wireless communication devices allocated to the first class, selecting the second local cloud computing resource 140 for wireless communication devices allocated to the second class, and selecting the central cloud computing resource 150 for wireless communication devices allocated to the global class. By such an allocation into different mobility classes, the selection of cloud computing resources is alleviated as it is performed for all communication devices classified into the same class.

According to another embodiment, the communication network 100 further comprises a third access subnetwork serving wireless communication devices residing in a third geographic area, and a regional cloud computing resource connected to the first access subnetwork 110 and to the third access subnetwork. Further, the obtaining 202 of mobility information over a time period further comprises obtaining information of when, during the time period, each of the plurality of wireless communication devices has wireless access to the communication network 100 via the third access subnetwork 110, and when it is determined that one of the plurality of wireless communication devices 180 has wireless access to the communication network alternately via the first access subnetwork 110 and via the third access subnetwork, selecting 204 the third cloud computing resource to serve the one of the plurality of wireless communication devices. Hereby, a user of the one of the plurality of wireless communication devices commuting between the first geographic area and the third geographic area is served by the third cloud computing resource, whereby resources are best used in the network. Hereby, tromboning is avoided for the commuting user, which would occur if the user is handled by the first cloud computing resource when the user is in the third geographic area. Further, in case the communication network comprises a central cloud computing resource, the central cloud computing resource is connected to the third access subnetwork as well as to the first and second access subnetwork, preferably through an IP-backbone network. Then a high latency is avoided that may occur if the user would be handled by the central cloud computing resource. In case the embodiment of allocation of class is used, the one of the plurality of wireless communication devices would be allocated a regional class.

Figure 3:
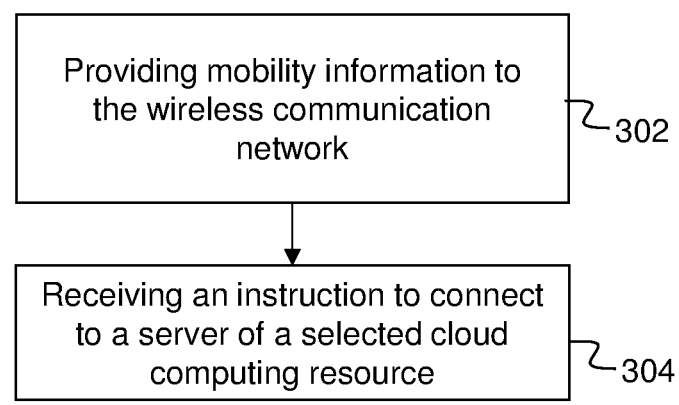
FIG. 3 is a flow chart illustrating of a method performed by a wireless communication device, according to possible embodiments.

FIG. 3, in conjunction with FIG. 1, describes a method performed by a wireless communication device 180 in communication with a wireless communication network 100, for handling cloud computing resources. The wireless communication network 100 comprises a first access subnetwork 110 for providing wireless access to wireless communication devices residing in a first geographic area, and a second access subnetwork 120 for providing wireless access to wireless communication devices residing in a second geographic area. The wireless communication network 100 further comprises a first cloud computing resource 130 connected to the first access subnetwork 110 and a second cloud computing resource 140 connected to the second access subnetwork 120. The method comprises providing 302, to the wireless communication network 100, mobility information over a time period, the mobility information comprising information of when, during the time period, the wireless communication device 180 has wireless access to the communication network 100 via the first access subnetwork 110 and when the wireless communication device 180 has wireless access to the communication network 100 via the second access subnetwork 120. The method further comprises, receiving 304, from the wireless communication network 100, an instruction to connect to a server that is connected to a selected one of the first or the second cloud computing resource 130, 140, the selection of first or second cloud computing resources being based on the provided mobility information. The mobility information may be provided to the system of the communication network described in relation to FIG. 2. The communication network, or the system in the communication network can then use the mobility information provided by the wireless communication device to select which of the first or second cloud computing resource that the wireless communication device 180 is to connect to. Further, the wireless communication device connects to a server of the selected cloud computing resource according to the instructions it receives from the network. The instruction to connect to a server may be a HTTP redirect, comprising an address to the new server, or the instruction may comprise a TCP-address to the server. As an alternative, in case the wireless communication device is multi-homed to more than one gateway, the instruction comprises an update of an IPv6 prefix to be used.

The current existing distributed cloud architecture does not consider the mobility of the communication devices, aka clients. The deployment of resources in the distributed cloud is today selected from resource or network performance perspective, but does not consider the degradation caused by handling a wireless communication device on a non-optimal distributed cloud resource considering its mobility. The resources in the distributed cloud may be servers or application resources. The resources in the distributed cloud may be cloud infrastructure resources and network function resources, i.e. Virtual Network Functions, VNFs, allocated to the cloud resources. Depending on the location of the client and the cloud resource it is connected to, different performance is achieved. A person with a wireless communication device, hereinafter called an end-user, which travels between home and his/her workplace generates a mobility pattern for his/her daily travelling. During weekends, the end-user may travel to other places i.e. summer house. According to an embodiment of the invention, such mobility pattern is observed in the wireless communication network and stored, and thereafter used to select which distributed cloud resource (in this case it may be cloud infrastructure resources) that is to support the client.

Tracking and storing mobility patterns of end-users as part of the wireless communication network functions has not been supported in 3GPP specifications. However, in the current R15 Service Based Architecture TS 23.501 and TS 23.502, "Expected UE Behavior" parameters include "Expected UE Moving Trajectory", which is exposed by a Network Exposure Function (NEF) used by external applications and possibly also internal network functions. The NEF uses mobility event information sent from Access and mobility Management Function (AMF) or Service Management Function (SMF), but 3GPP has not defined how this parameter can be used, nor how the predicted mobility parameters are created or when that data is sent. In some embodiments, the inventors propose to use any Expected UE behavior parameter in combination with 3GPP specified mobility related event reporting services that are sent also from NEF or direct from AMF or SMF, to build needed mobility patterns for the wireless communication devices.

Going back to the end-user commuting between home and work, and looking at FIG. 1 again: If both work and home of the end-user lies within a geographic area covered by the 1st access subnetwork 110, the wireless device of this end-user should be connected to the first cloud computing resource 130 that has a local connection to the first access subnetwork 110. This would result in low latencies for this end-user. On the other hand, such a local deployment would increase the probability for tromboning in the backhaul for end-users that are moving outside the geographic area above. For example, if home lies in a geographic area covered by the first access subnetwork 110 and work lies in a geographic area covered by the second access subnetwork 120 and the device of the end-user would be connected to the first cloud computing resource 130, the connection from the first CC resource 130 to the device 180 of the end-user would need to go from the first CC resource 130 via the IP backbone network 155 and the second core network 170 to the second access subnetwork 120 to be able to reach the device when connected to the second access subnetwork. This is what tromboning means and this would result in long latency times for delivering data to the device. Such tromboning may be especially problematic for e.g. a salesman working with e.g. AR/VR tools in the sales process which requires low latencies in the network to perform acceptable, or for network-assisted driving applications and car safety applications requiring edge deployment to get robustness and lower latencies. Instead, when home is in an area covered by the first access subnetwork 110 and work is in an area covered by the second access subnetwork 120, the device of the end-user of the example should be connected to the central cloud computing resource 150.

On the other hand, if the communication network of FIG. 1 would also have a regional cloud computing resource having a local connection to the first and the second access subnetwork, but not to a third access subnetwork (not shown), the end-user of the latest example is to be handled at this regional cloud computing resource, whereas another end-user travelling across all three subnetworks is to be handled at the central cloud computing resource.

So, given a certain distribution of cloud computing resources in the communication network, the obtained aggregated mobility pattern of a set of wireless devices should be used to select an optimal deployment of wireless devices to cloud computing resources, taking into account low latency times as well as cloud computing capacity and network capacity. A "short path" to a local cloud gives good network characteristics as long as the wireless device is within the geographical area served by the access subnetwork that the local cloud is connected to.

Figure 4:
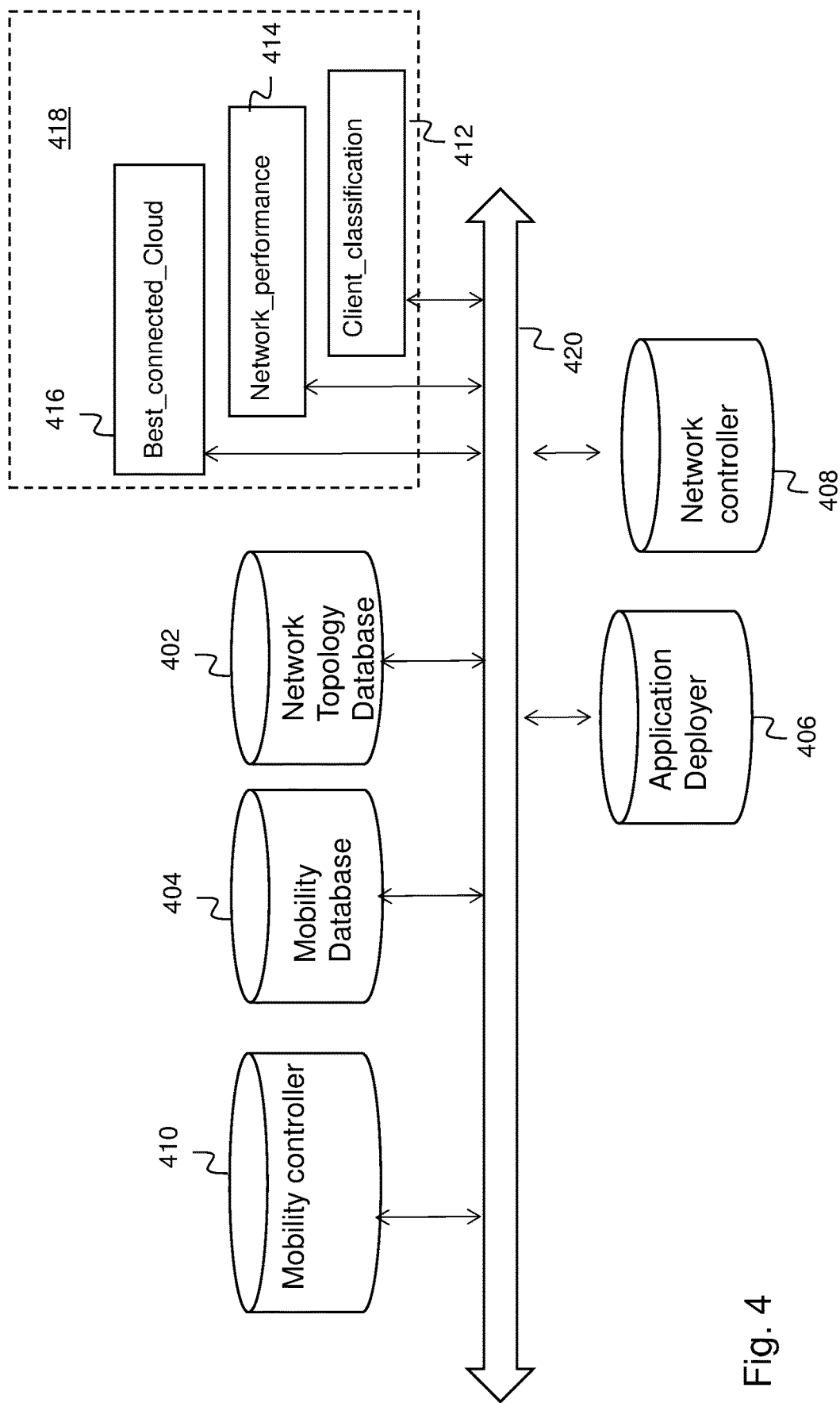
FIG. 4 is a schematic block diagram illustrating an example of functions and nodes for implementing possible embodiments of the invention.

FIG. 4 is a block diagram of an exemplary architecture comprising databases, servers/controllers and functions for performing the described methods. The architecture comprises a network topology database 402, a mobility database 404, an application deployer 406, a network controller 408, a mobility controller 410 and functions like a client classification function 412, a network performance function 414 and a function for determining best connected cloud called "best-connected function" 416. The client classification function 412, the network performance function 414 and the best-connected function 416 may be arranged in a processing circuitry 418. All databases, deployers, controllers and functions are connected via a service bus 420. The network topology database 402 describes the topology of the wireless communication network 100, with its nodes, i.e. routers, access gateways, e.g. Packet Data Network-Gateway (PDN-GW) described as separate nodes or grouped in subnetworks. The network topology database 402 further describes how the cloud computing resources are connected to the subnetworks. The cloud computing resources are described as endpoints in the topology database. Performance of communication interfaces between nodes in the network topology, such as RTT, packet loss, delay, number of hops may also be described in the network topology database.

The mobility database 404 comprises collected time series of mobility data of wireless communication devices, i.e. information of time and position of individual wireless communication devices in the communication network. The mobility database 404 obtains information regarding time and position of wireless communication devices from the mobility controller 410. The information may be handover information. The mobility controller 410 may be any standard node in the wireless communication network for controlling mobility of wireless communication devices in a communication network, such as a Mobility Management Entity (MME) in 4G or an Access and mobility Management Function (AMF) or Service Management Function (SMF) in 5G. The handover information contains identities of which base-station/cell the client is connected to or using. The handover information may be both Cell-ID (from the AMF) and node ID (from SMF) of a gateway. The mobility of a client can be described in a time-sequence of handovers i.e. record of {from cellId, to CellID, time} or {fromGPS, toGPS, time}. The CellId, or base station ID, can be associated with a physical location of the client. The base station ID can also in some cases be the transport IP-address of the base station.

The application deployer 406 is arranged for deploying applications and network functions based on received requests for such deployment. There may be a Service Assurance Function that triggers a request to the application deployer to deploy the needed functions and to trigger the network controller for configuring transport links and switches, also called network orchestration.

The network controller 408 is arranged for setting the routing of data related to wireless communication devices to the appropriate cloud computing resource. In other words, the network controller 408 sets the routing of data depending on to which cloud computing resource each wireless communication device is connected. The network controller 408 may be a Software Defined Networking, SDN, controller that can configure routers.

The client classification function 412 is used for classifying the wireless communication devices (herein called "clients") in the communication network according to their mobility. The classification is based on identification of significant positions for the individual clients according to the following sequence:

0) Fetch mobility traces for a client from the mobility database 404;
1) Map the mobility trace to geographical positions, such as two-dimensional x,y-coordinates;
2) Map the geographical positions into a three-dimensional Cartesian coordinate diagram with position on x,y axis and frequency of occurrence of that position on the z-axis;
3) Compare, in the diagram, the frequency of the different positions to thresholds in order to determine positions that have significance of the client, i.e. positions visited many times by the client;
4) Classify mobility behavior for the individual clients according to e.g. the classification shown in the following paragraph.

Figure 5:
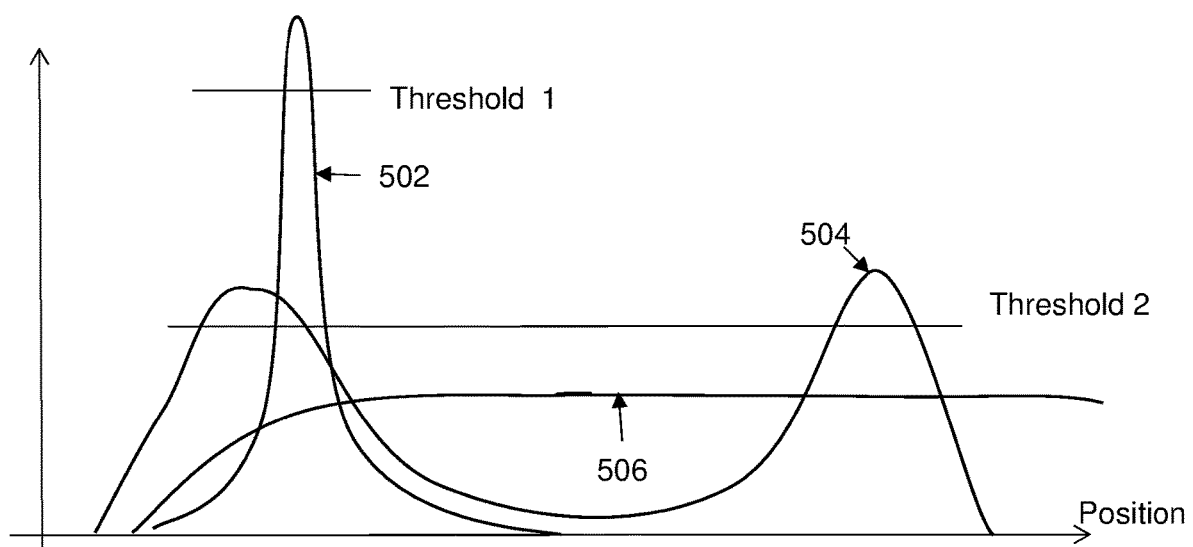
FIG. 5 is a diagram of a Cartesian coordinate system illustrating frequency of different positions in the network over a time period for wireless communication devices.

FIG. 5 shows an example diagram with position mapped on one axis and frequency of occurrence of that position on the other axis. In two-dimension positions, the graphs will have the same basic characteristics: number of peaks and height. A possible classification scheme is to classify the clients into:

Stationary clients, which are clients with no or geographically limited mobility and that are connected to only one access subnetwork, e.g. one and the same access gateway. The mobility is "hidden" by the RAN-internal mobility. In a diagram such as in FIG. 5, the client is visible at single point with high probability. Threshold 1 in FIG. 5 is a threshold of frequency of occurrence that needs to be passed for a client to be classified as stationary. As can be seen in FIG. 5, client 502 passes that threshold and is consequently classified as a stationary client;

Clients with daily mobility, for example commuting between home and office so that they are connected to different access subnetworks at home and at the office. In this case the mobility during weekdays are analyzed to see how clients are behaving. This category of clients is appearing in two points: home and office, it is a high peak in a histogram based on position of the clients. In order to be classified as a client with daily mobility, a second threshold (Threshold 2) has to be passed at two different positions. As can be seen in FIG. 5, client 504 passes threshold 2 twice and is consequently classified as a client with daily mobility. Threshold 2 is set lower than Threshold 1;

Clients with wide-area mobility, e.g. a typical salespersonal. This is a client that has a rather flat occurrence of positions in a diagram such as FIG. 5 or in a histogram. This means that the geographic position of the client is "random" during the weekday without any specific peaks. Client 506 in FIG. 5 is an example of such a client.

Please observe that FIG. 5 is only showing one-dimensional position characteristics while the real network position is two-dimensional. This is only a simplification made to better illustrate how the comparison of position and frequency of the position is performed in order to classify the clients. Also, the frequency of positions are thresholds to limit the problem with fluctuation in the measured mobility records.

Going back to FIG. 4, the network performance function 414 is arranged to calculate the network performance of paths between the access subnetwork serving a certain client (e.g. a base station of the access subnetwork serving the client) and the different cloud computing resources. This calculation is then used for placement of the clients in the different cloud computing resources. For those position that are above Threshold 1 and Threshold 2 (see FIG. 5), the position is mapped in the network topology database 402 so that different topological paths can be identified. If the mobility database 404 includes IP-endpoint addresses of the base-stations, these may directly be used for those positions to define the IP-endpoints in the topology. The network topology database 402 can use many types of identities depending on how the topology is defined. The mobility-trace stored in the mobility database 404 may also be composed of different identities, depending on the network exposure interface. The output from the network topology function can have several formats i.e. average number of hops for the handover time-series or the average number of hops during the mobility period.

The best-connected function 416 comprises algorithms for determining to which cloud computing resource the client is to be connected. For clients that have been determined to be Clients with daily mobility, the following algorithm may apply: For each mobility time-series do an estimation of best-connected cloud computing resource given a) minimum number of hops or b) minimum of {delay or packet-loss} based on the determined network performance. For clients that have been determined to be Stationary clients, the following algorithm may apply: Estimate the best cloud computing resource based on a) minimum number of hops or b) minimum of {delay or packet-loss} between the access subnetwork to which the client is connected and the different cloud computing resources. For clients that have been determined to be Clients with wide-area mobility: Recommend placement in a centralized cloud computing resource.

Figure 6:
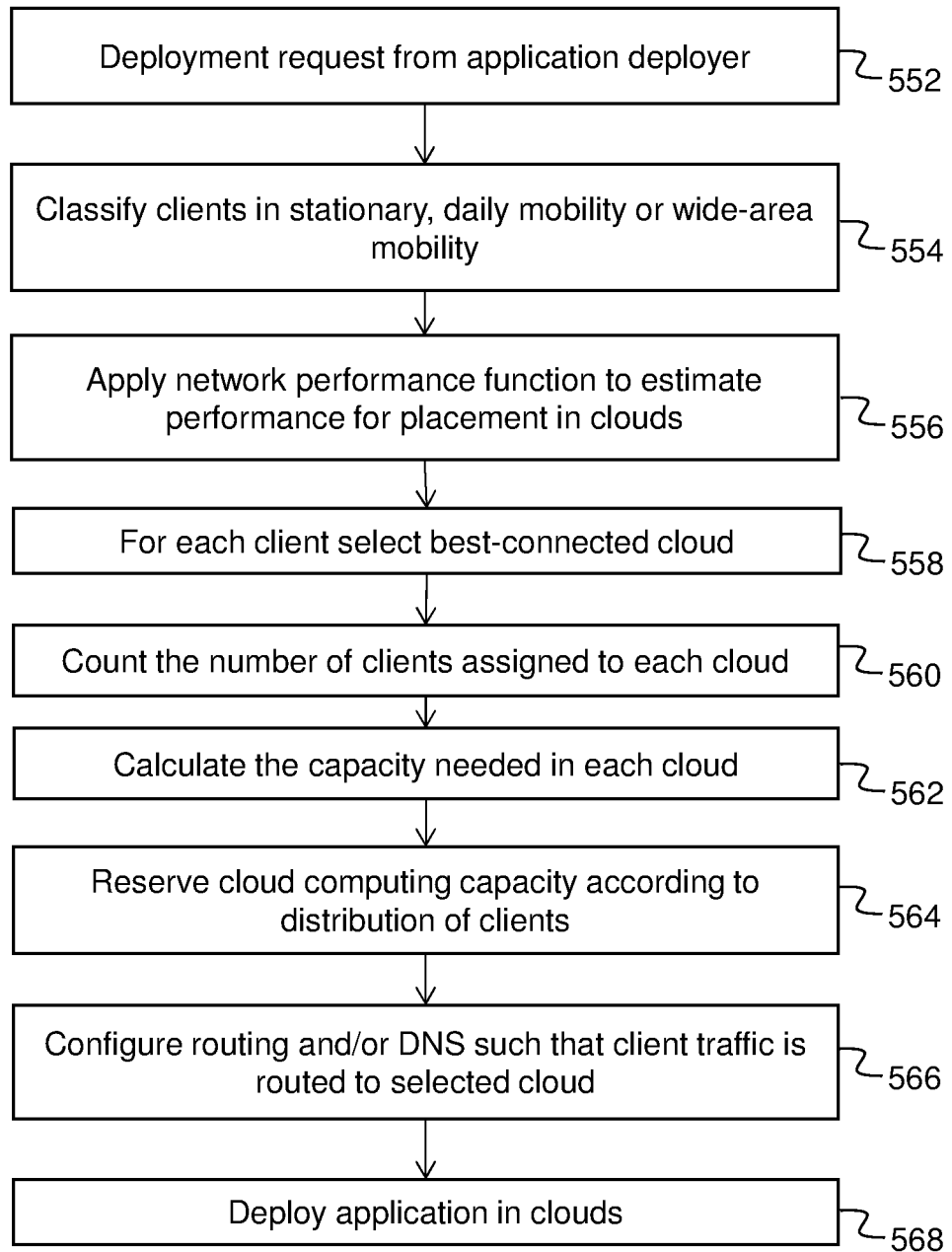
FIG. 6 is a flow chart illustrating an example embodiment of a method performed by a system of the wireless communication network.

FIG. 6 describes an embodiment in which a method is performed by a system of a wireless communication network for handling cloud computing resources using an architecture as described in FIG. 4. The method comprises receiving 552 a deployment request from the application deployer 406 for deploying an application in a distributed cloud, the application being used by clients in a communication network. Thereafter, the clients in the communication network are classified 554 as stationary clients, daily mobility clients or wide-area mobility clients based on mobility data for each client, the mobility data being stored in the mobility database 404. Thereafter, for each client, the network performance function 414 is applied 556 in order to estimate performance of paths between the access subnetwork serving a certain client and the different cloud computing resources, for placement of the client handling in different cloud computing resources. Then, the best-connected cloud computing resource is selected 558 for each client, the number of clients assigned to each cloud computing resource is counted 560 and the capacity needed at each cloud computing resource is calculated 562 based on the number of clients assigned. Thereafter, capacity in each cloud computing resource is reserved 564 according to distribution of clients. Then the network controller 408 configures 566 routing and/or DNS such that client traffic is routed to the selected cloud computing resource, where after the application deployer 406 deploys 568 the application in the cloud computing resources.

Figure 7:
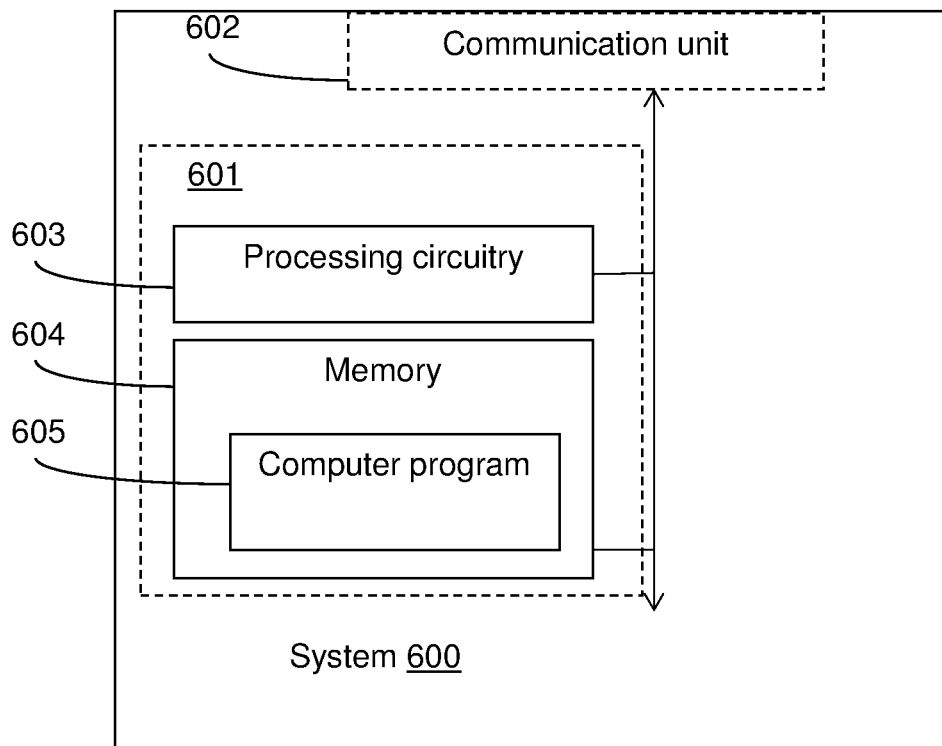
FIGS. 7-8 are block diagrams illustrating a system of a wireless communication network in more detail, according to further possible embodiments.

FIG. 7, in conjunction with FIG. 1, describes an embodiment of a system 600 operable in a wireless communication network 100, and configured for handling cloud computing resources. The wireless communication network comprises a first access subnetwork 110 providing wireless access to wireless communication devices residing in a first geographic area, a second access subnetwork 120 providing wireless access to wireless communication devices residing in a second geographic area, and a first cloud computing resource 130 connected to the first access subnetwork 110 and a second cloud computing resource 140 connected to the second access subnetwork 120. The system 600 comprises a processing circuitry 603 and a memory 604. The memory contains instructions executable by said processing circuitry, whereby the system 600 is operative for obtaining mobility information over a time period for a plurality of wireless communication devices 180 having wireless access to the communication network, the mobility information comprising information of when, during the time period, each of the plurality of wireless communication devices 180 has wireless access to the communication network 100 via the first access subnetwork 110 and when, each of the plurality of wireless communication devices 180 has wireless access to the communication network 100 via the second access subnetwork 120. The system is further operative for selecting which of the first or second cloud computing resource 130, 140 that is to serve each of the plurality of wireless communication devices 180 based on the obtained mobility information of the plurality of wireless communication devices, and for sending an instruction to each of the plurality of wireless communication devices 180 to connect to a server that is connected to the selected cloud computing resource for that wireless communication device 180, or, for each of the plurality of wireless communication devices, triggering routing of data directed towards the wireless communication device or originating from the wireless communication device to the selected cloud computing resource.

The system of the wireless communication network may be a wireless communication network node, such as a core network node or an access network node or a router. Alternatively, the system of the wireless communication network may be a group of network nodes, wherein functionality of the system is spread out over different physical, or virtual, nodes of the network. In other words, the system for improving use of cloud computing resources may in its turn be a cloud-solution, i.e. the system may be deployed as cloud computing resources that may be distributed in the network.

According to an embodiment, the system is operative for selecting the first cloud computing resource 130 for the ones of the plurality of wireless communication devices 180 that predominantly have wireless access to the communication network 100 via the first access subnetwork 110 during the time period, and for selecting the second cloud computing resource 140 for the ones of the plurality of wireless communication devices 180 that predominantly have wireless access to the communication network 100 via the second access subnetwork 120 during the time period.

According to another embodiment, the system is operative for selecting which of the first or the second cloud computing resource 130, 140 that is to serve each of the plurality of wireless communication devices 180 based on capacity of the first and the second cloud computing resource or on communication capacity from the first and the second cloud computing resource and its respective first and second access subnetwork 110, 120, as well as on the obtained mobility information of the plurality of wireless communication devices 180.

According to another embodiment, the system is operative for selecting which of the first or second cloud computing resource 130, 140 that is to serve each of the plurality of wireless communication devices 180 based also on mobility pattern, such as velocity of the wireless communication device or number of handovers performed by the wireless communication device, and/or on communication pattern, such as amount of communication with application servers of the plurality of wireless communication devices 180.

According to another embodiment, the system is further operative for deploying application resources in the first and second cloud computing resource based on the selecting of the first or the second cloud computing resource for the plurality of wireless communication devices.

According to another embodiment, the communication network 100 further comprises a central cloud computing resource 150 connected to the first access subnetwork 110 and to the second access subnetwork 120 via a respective core subnetwork 160, 170 in which the respective first and second cloud computing resource 130, 140 is arranged. Further, the system is operative for selecting the first cloud computing resource 130 for the ones of the plurality of wireless communication devices that predominantly has wireless access to the communication network 100 via the first access subnetwork 110 during the time period, selecting the second cloud computing resource 140 for the ones of the plurality of wireless communication devices that predominantly has wireless access to the communication network 100 via the second access subnetwork 120 during the time period and selecting the central cloud computing resource 150 for the ones of the plurality of wireless communication devices which wireless access to the communication network 100 is alternating between the first access subnetwork 110 and the second access subnetwork 120 during the time period.

According to another embodiment, the communication network further comprises a central cloud computing resource 150 connected to the first access subnetwork 110 and to the second access subnetwork 120. Further, the system is further operative for allocating, based on the mobility information, each of the plurality of wireless communication devices to either a first class for local mobility in the first access subnetwork, a second class for local mobility in the second access subnetwork, or a global class for mobility in both the first and the second access subnetwork. Further, the system is operative for selecting the first local cloud computing resource 130 for wireless communication devices allocated to the first class, for selecting the second local cloud computing resource 140 for wireless communication devices allocated to the second class, and for selecting the central cloud computing resource 150 for wireless communication devices allocated to the global class.

According to another embodiment, the communication network 100 further comprises a third access subnetwork serving wireless communication devices residing in a third geographic area and a regional cloud computing resource connected to the first access subnetwork 110 and to the third access subnetwork. The system is operative for the obtaining of mobility information over a time period by obtaining information of when, during the time period, each of the plurality of wireless communication devices has wireless access to the communication network 100 via the third access subnetwork 110, and when it is determined that one of the plurality of wireless communication devices 180 has wireless access to the communication network alternately via the first access subnetwork 110 and via the third access subnetwork, selecting the third cloud computing resource to serve the one of the plurality of wireless communication devices.

According to other embodiments, the system 600 may further comprise a communication unit 602, which may be considered to comprise conventional means for communication with nodes in the communication network. The instructions executable by said processing circuitry 603 may be arranged as a computer program 605 stored e.g. in said memory 604. The processing circuitry 603 and the memory 604 may be arranged in a sub-arrangement 601. The sub-arrangement 601 may be a micro-processor and adequate software and storage therefore, a Programmable Logic Device, PLD, or other electronic component(s)/processing circuit(s) configured to perform the methods mentioned above. The processing circuitry 603 may comprise one or more programmable processor, application-specific integrated circuits, field programmable gate arrays or combinations of these adapted to execute instructions.

The computer program 605 may be arranged such that when its instructions are run in the processing circuitry, they cause the system 600 to perform the steps described in any of the described embodiments of the system 600 and its method. The computer program 605 may be carried by a computer program product connectable to the processing circuitry 603. The computer program product may be the memory 604, or at least arranged in the memory. The memory 604 may be realized as for example a RAM (Random-access memory), ROM (Read-Only Memory) or an EEPROM (Electrical Erasable Programmable ROM). Further, the computer program 605 may be carried by a separate computer-readable medium, such as a CD, DVD or flash memory, from which the program could be downloaded into the memory 604. Alternatively, the computer program may be stored on a server or any other entity to which the system 600 has access via the communication unit

602. The computer program 605 may then be downloaded from the server into the memory 604.

Figure 8:
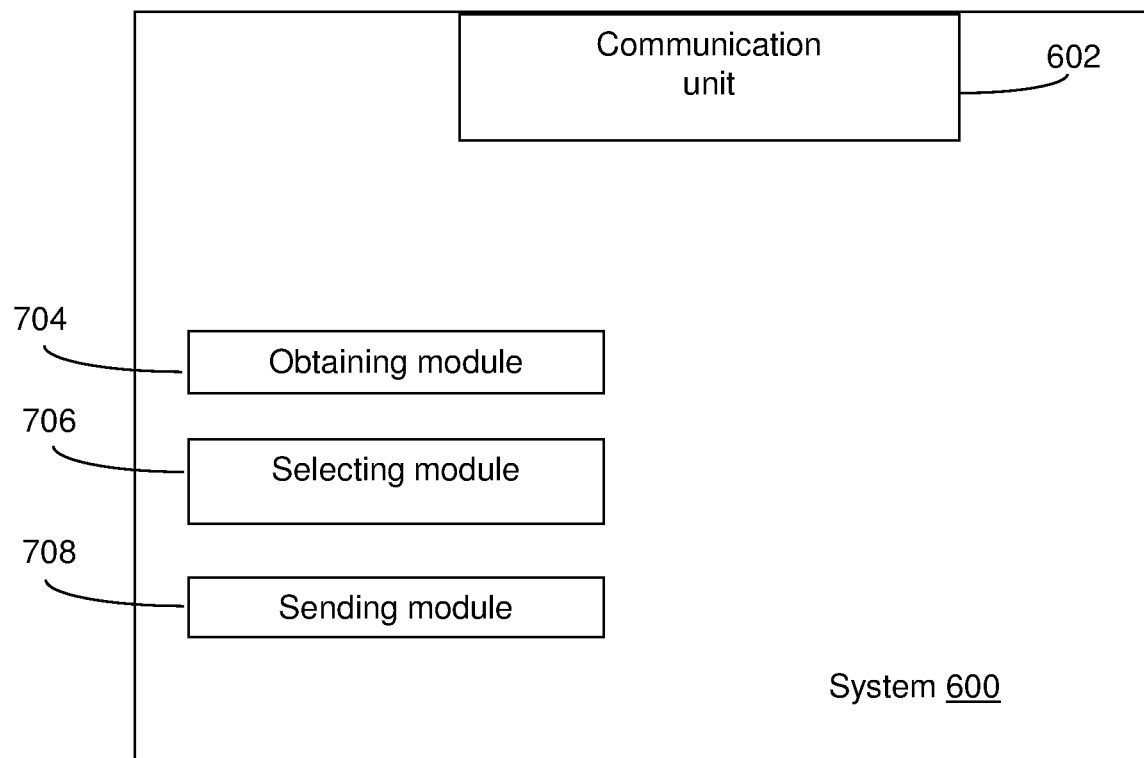

FIG. 8, in conjunction with FIG. 1, describes an alternative embodiment of a system 600 operable in a wireless communication network 100, and configured for handling cloud computing resources. The wireless communication network comprises a first access subnetwork 110 providing wireless access to wireless communication devices residing in a first geographic area, a second access subnetwork 120 providing wireless access to wireless communication devices residing in a second geographic area, and a first cloud computing resource 130 connected to the first access subnetwork 110 and a second cloud computing resource 140 connected to the second access subnetwork 120. The system 600 comprises an obtaining module 704 for obtaining mobility information over a time period for a plurality of wireless communication devices 180 having wireless access to the communication network, the mobility information comprising information of when, during the time period, each of the plurality of wireless communication devices 180 has wireless access to the communication network 100 via the first access subnetwork 110 and when, each of the plurality of wireless communication devices 180 has wireless access to the communication network 100 via the second access subnetwork 120. The system further comprises a selecting module 706 for selecting which of the first or second cloud computing resource 130, 140 that is to serve each of the plurality of wireless communication devices 180 based on the obtained mobility information of the plurality of wireless communication devices. The system further comprises a sending module 708 for sending an instruction to each of the plurality of wireless communication devices 180 to connect to a server that is connected to the selected cloud computing resource for that wireless communication device 180, or, for each of the plurality of wireless communication devices, triggering routing of data directed towards the wireless communication device or originating from the wireless communication device to the selected cloud computing resource. The system 600 may further comprise a communication unit 602 similar to the communication unit described in FIG. 7. In an embodiment, the modules of FIG. 8 are implemented as a computer program running on a processing circuitry, such as the processing circuitry 603 shown in FIG. 7.

Figure 9:
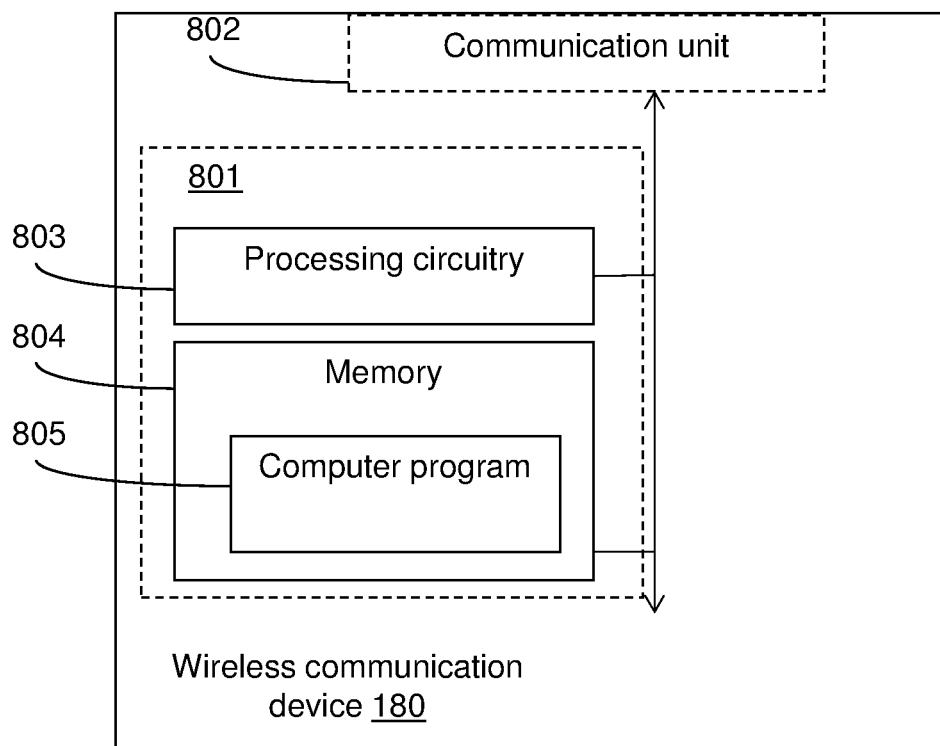
FIGS. 9-10 are block diagrams illustrating a wireless communication device in more detail, according to further possible embodiments.

FIG. 9, in conjunction with FIG. 1, shows a wireless communication device 180 configured for communication with a wireless communication network 100. The wireless communication network comprises a first access subnetwork 110 for providing wireless access to wireless communication devices residing in a first geographic area, a second access subnetwork 120 for providing wireless access to wireless communication devices residing in a second geographic area, a first cloud computing resource 130 connected to the first access subnetwork 110 and a second cloud computing resource 140 connected to the second access subnetwork 120. The wireless communication device 180 comprises a processing circuitry 803 and a memory 804. The memory contains instructions executable by said processing circuitry, whereby the wireless communication device 180 is operative for providing, to the wireless communication network 100, mobility information over a time period, the mobility information comprising information of when, during the time period, the wireless communication device 180 has wireless access to the communication network 100 via the first access subnetwork 110 and when the wireless communication device 180 has wireless access to the communication network 100 via the second access subnetwork 120. The wireless communication device 180 is further operative for receiving, from the wireless communication network 100, an instruction to connect to a server that is connected to a selected one of the first or the second cloud computing resource 130, 140, the selection of first or second cloud computing resources being based on the provided mobility information.

According to other embodiments, the wireless communication device 180 may further comprise a communication unit 802, which may be considered to comprise conventional means for wireless communication with radio access nodes of the first and second access subnetwork, such as a transceiver for wireless transmission and reception. The instructions executable by said processing circuitry 803 may be arranged as a computer program 805 stored e.g. in said memory 804. The processing circuitry 803 and the memory 804 may be arranged in a sub-arrangement 801. The sub-arrangement 801 may be a micro-processor and adequate software and storage therefore, a Programmable Logic Device, PLD, or other electronic component(s)/processing circuit(s) configured to perform the methods mentioned above. The processing circuitry 803 may comprise one or more programmable processor, application-specific integrated circuits, field programmable gate arrays or combinations of these adapted to execute instructions.

The computer program 805 may be arranged such that when its instructions are run in the processing circuitry, they cause the wireless communication device 180 to perform the steps described in any of the described embodiments of the wireless communication device 180 and its methods. The computer program 805 may be carried by a computer program product connectable to the processing circuitry 803. The computer program product may be the memory 804, or at least arranged in the memory. The memory 804 may be realized as for example a RAM (Random-access memory), ROM (Read-Only Memory) or an EEPROM (Electrical Erasable Programmable ROM). Further, the computer program 805 may be carried by a separate computer-readable medium, such as a CD, DVD or flash memory, from which the program could be downloaded into the memory 804. Alternatively, the computer program may be stored on a server or any other entity connected to the wireless communication network 100, to which the wireless communication device 180 has access via the communication unit 802. The computer program 805 may then be downloaded from the server into the memory 804.

Figure 10:
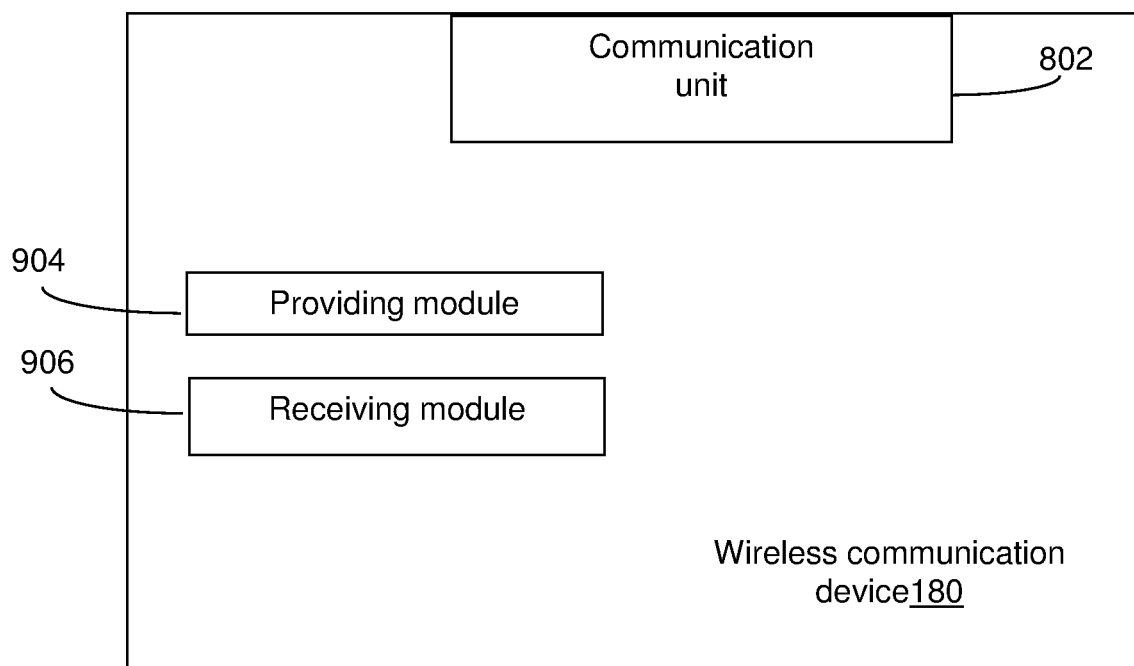

FIG. 10, in conjunction with FIG. 1, shows an alternative embodiment of a wireless communication device 180 configured for communication with a wireless communication network 100, the wireless communication network comprising a first access subnetwork 110 for providing wireless access to wireless communication devices residing in a first geographic area, a second access subnetwork 120 for providing wireless access to wireless communication devices residing in a second geographic area, a first cloud computing resource 130 connected to the first access subnetwork 110 and a second cloud computing resource 140 connected to the second access subnetwork 120. The wireless communication device 180 comprises a providing module 904 for providing, to the wireless communication network 100, mobility information over a time period, the mobility information comprising information of when, during the time period, the wireless communication device 180 has wireless access to the communication network 100 via the first access subnetwork 110 and when the wireless communication device 180 has wireless access to the communication network 100 via the second access subnetwork 120. The wireless communication device 180 further comprises a receiving module 906 for receiving, from the wireless communication network 100, an instruction to connect to a server that is connected to a selected one of the first or the second cloud computing resource 130, 140, the selection of first or second cloud computing resources being based on the provided mobility information. The wireless communication device 180 may further comprise a communication unit 802 similar to the communication unit described in FIG. 9. In an embodiment, the modules of FIG. 10 are implemented as a computer program running on a processing circuitry, such as the processing circuitry 803 shown in FIG. 9.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby. In the exemplary figures, a broken line generally signifies that the feature within the broken line is optional.

The invention claimed is:

1. A method, performed by a system of a wireless communication network, for handling cloud computing resources, the wireless communication network comprising a first access subnetwork providing wireless access to wireless communication devices residing in a first geographic area, a second access subnetwork providing wireless access to wireless communication devices residing in a second geographic area, a first cloud computing resource connected to the first access subnetwork, and a second cloud computing resource connected to the second access subnetwork, and a central cloud computing resource connected to the first and second access subnetworks, the method comprising:
    obtaining mobility information over a time period for a plurality of wireless communication devices having wireless access to the communication network, the mobility information comprising information of when, during the time period, each of the plurality of wireless communication devices has wireless access to the communication network via the first access subnetwork and when each of the plurality of wireless communication devices has wireless access to the communication network via the second access subnetwork;
    selecting which of the cloud computing resources is to serve each of the plurality of wireless communication devices based on the obtained mobility information, wherein the selecting comprises:
        selecting the first cloud computing resource for wireless communication devices that predominantly have wireless access to the wireless communication network via the first access subnetwork during the time period;
        selecting the second cloud computing resource for wireless communication devices that predominantly have wireless access to the wireless communication network via the second access subnetwork during the time period; and
        selecting the central cloud computing resource for wireless communication devices that predominantly alternate between the first and second access subnetworks to access the wireless communication network during the time period; and
    deploying application resources in the first and second cloud computing resources based on the selecting of which of the cloud computing resources is to serve each of the plurality of wireless communication devices.

2. The method of claim 1, further comprising sending an instruction to each of the plurality of wireless communication devices to connect to a server that is connected to the selected cloud computing resource for that wireless communication device.

3. The method of claim 1, further comprising, for each of the plurality of wireless communication devices, triggering routing of data directed towards the wireless communication device, or originating from the wireless communication device, to the selected cloud computing resource.

4. The method of claim 1, wherein selecting which of the cloud computing resources is to serve each of the plurality of wireless communication devices is further based on a mobility pattern and/or a communication pattern of the wireless communication device.

5. The method of claim 1, wherein deploying application resources in the first and second cloud computing resources is further based on a mobility pattern and/or a communication pattern of the wireless communication device.

6. The method of claim 1, further comprising receiving a deployment request to deploy the application resources from an application deployer device.

7. The method of claim 1, further comprising:
    analyzing which of a plurality of content-specific applications that the plurality of wireless communication devices have installed or have used during the time period; and
    wherein deploying the application resources in the first and second cloud computing resources is further based on the analyzing.

8. The method of claim 7, wherein analyzing which of a plurality of content-specific applications that the plurality of wireless communication devices have installed or have used during the time period comprises determining at least one of:
    a frequency of use of the content-specific applications by the plurality of wireless communication devices;
    a detected change in usage of the content-specific applications by the plurality of wireless communication devices; and
    an analysis of traffic being communicated between the plurality of wireless communication devices and the first and second cloud computing resources.

9. A system operable in a wireless communication network and configured for handling cloud computing resources, the wireless communication network comprising a first access subnetwork providing wireless access to wireless communication devices residing in a first geographic area, a second access subnetwork providing wireless access to wireless communication devices residing in a second geographic area, a first cloud computing resource connected to the first access subnetwork, a second cloud computing resource connected to the second access subnetwork, and a central cloud computing resource connected to the first access subnetwork and to the second access subnetwork, the system comprising:

processing circuitry; and
memory comprising instructions executable by the processing circuitry whereby the system is configured to:
obtain mobility information over a time period for a plurality of wireless communication devices having wireless access to the communication network, the mobility information comprising information of when, during the time period, each of the plurality of wireless communication devices has wireless access to the communication network via the first access subnetwork and when each of the plurality of wireless communication devices has wireless access to the communication network via the second access subnetwork;
select which of the cloud computing resources is to serve each of the plurality of wireless communication devices based on the obtained mobility information, wherein the instructions are such that the system is configured to:
select the first cloud computing resource for wireless communication devices that predominantly have wireless access to the wireless communication network via the first access subnetwork during the time period;
select the second cloud computing resource for wireless communication devices that predominantly have wireless access to the wireless communication network via the second access subnetwork during the time period; and
select the central cloud computing resource for wireless communication devices that predominantly alternate between the first and second access subnetworks to access the wireless communication network during the time period; and
deploy application resources in the first and second cloud computing resources based on the selection of which of the cloud computing resources is to serve each of the plurality of wireless communication devices.

10. The system of claim 9, wherein the instructions are such that the system is further configured to send an instruction to each of the plurality of wireless communication devices to connect to a server that is connected to the selected cloud computing resource for that wireless communication device.

11. The system of claim 9, wherein the instructions are such that the system is further configured to, for each of the plurality of wireless communication devices, trigger routing of data directed towards the wireless communication device, or originating from the wireless communication device, to the selected cloud computing resource.

12. The system of claim 9, wherein the instructions are such that the system is further configured to select which of the cloud computing resources is to serve each of the plurality of wireless communication devices based further on a mobility pattern and/or a communication pattern of the wireless communication device.

13. The system of claim 10, wherein the instructions are such that the system is further configured to receive a deployment request to deploy the application resources from an application deployer device.

14. The system of claim 9, wherein the instructions are such that the system is further configured to deploy application resources in the first and second cloud computing resources based further on a mobility pattern and/or a communication pattern of the wireless communication device.

15. The system of claim 9, wherein the instructions are such that the system is further configured to deploy the application resources in the first and second cloud computing resources based further on an analysis of which of a plurality of content-specific applications that the plurality of wireless communication devices have installed or have used during the time period.

16. The system of claim 15, wherein to analyze which of the plurality of content-specific applications that the plurality of wireless communication devices have installed or have used during the time period comprises, the instructions are such that the system is further configured to determine at least one of:
a frequency of use of the content-specific applications by the plurality of wireless communication devices;
a detected change in usage of the content-specific applications by the plurality of wireless communication devices; and
an analysis of traffic being communicated between the plurality of wireless communication devices and the first and second cloud computing resources.

17. A non-transitory computer readable recording medium storing a computer program product for controlling a system of a wireless communication network for handling cloud computing resources, the wireless communication network comprising a first access subnetwork providing wireless access to wireless communication devices residing in a first geographic area, a second access subnetwork providing wireless access to wireless communication devices residing in a second geographic area, a first cloud computing resource connected to the first access subnetwork, a second cloud computing resource connected to the second access subnetwork, and a central cloud computing resource connected to the first access subnetwork and to the second access subnetwork, the computer program product comprising program instructions which, when run on processing circuitry of the system, causes the system to:
obtain mobility information over a time period for a plurality of wireless communication devices having wireless access to the communication network, the mobility information comprising information of when, during the time period, each of the plurality of wireless communication devices has wireless access to the communication network via the first access subnetwork and when each of the plurality of wireless communication devices has wireless access to the communication network via the second access subnetwork;
select which of the cloud computing resources is to serve each of the plurality of wireless communication devices based on the obtained mobility information, wherein the instructions are such that the system is configured to:
select the first cloud computing resource for wireless communication devices that predominantly have wireless access to the wireless communication network via the first access subnetwork during the time period;
select the second cloud computing resource for wireless communication devices that predominantly have wireless access to the wireless communication network via the second access subnetwork during the time period; and
select the central cloud computing resource for wireless communication devices that predominantly alternate between the first and second access subnetworks to access the wireless communication network during the time period; and deploy application resources in the first and second cloud computing resources based on the selection of which of the cloud computing resources is to serve each of the plurality of wireless communication devices.

\* \* \* \* \*